(12) United States Patent
Mende, Jr. et al.

(10) Patent No.: US 6,721,739 B1
(45) Date of Patent: Apr. 13, 2004

(54) SYSTEM AND METHOD FOR MAINTAINING AND RECOVERING DATA CONSISTENCY ACROSS MULTIPLE PAGES

(75) Inventors: Robert G. Mende, Jr., Boulder Creek, CA (US); Mayank V. Vasa, Sunnyvale, CA (US)

(73) Assignee: Silicon Graphics, Inc., Mountain View, CA (US)

(*) Notice: Subject to any disclaimer, the term of this patent is extended or adjusted under 35 U.S.C. 154(b) by 121 days.

(21) Appl. No.: 09/730,871

(22) Filed: Dec. 5, 2000

(51) Int. Cl.$^7$ .............................................. G06F 17/30
(52) U.S. Cl. .......................................... 707/8; 707/200
(58) Field of Search ............................ 707/8, 200–202, 707/500.1

(56) References Cited

U.S. PATENT DOCUMENTS

| | | | | |
|---|---|---|---|---|
| 4,843,542 A | * | 6/1989 | Dashiell et al. | 711/119 |
| 4,907,228 A | * | 3/1990 | Bruckert et al. | 714/11 |
| 5,193,162 A | * | 3/1993 | Bordsen et al. | 711/152 |
| 5,247,672 A | * | 9/1993 | Mohan | 707/8 |
| 5,263,142 A | * | 11/1993 | Watkins et al. | 710/22 |
| 5,301,290 A | * | 4/1994 | Tetzlaff et al. | 711/142 |
| 5,414,839 A | * | 5/1995 | Joshi | 707/533 |
| 5,418,940 A | * | 5/1995 | Mohan | 707/202 |
| 5,561,708 A | | 10/1996 | Remillard | 379/93.19 |
| 5,577,261 A | * | 11/1996 | Harinarayan et al. | 709/102 |
| 5,694,546 A | | 12/1997 | Reisman | 705/26 |
| 5,802,582 A | * | 9/1998 | Ekanadham et al. | 710/200 |
| 5,819,292 A | * | 10/1998 | Hitz et al. | 707/203 |
| 5,828,876 A | * | 10/1998 | Fish et al. | 707/1 |
| 5,887,167 A | * | 3/1999 | Sutton | 709/106 |
| 5,966,706 A | * | 10/1999 | Biliris et al. | 707/10 |
| 5,987,506 A | * | 11/1999 | Carter et al. | 709/213 |
| 6,006,299 A | * | 12/1999 | Wang et al. | 710/108 |
| 6,016,158 A | | 1/2000 | Mackinnon | 725/9 |
| 6,041,423 A | * | 3/2000 | Tsukerman | 711/114 |
| 6,128,623 A | | 10/2000 | Mattis et al. | 707/103 |
| 6,151,659 A | * | 11/2000 | Solomon et al. | 710/200 |
| 6,199,414 B1 | * | 3/2001 | Chang | 292/11 |
| 6,226,651 B1 | | 5/2001 | Masuda et al. | 707/202 |
| 6,286,092 B1 | | 9/2001 | Frank et al. | 711/207 |
| 6,289,356 B1 | * | 9/2001 | Hitz et al. | 707/201 |
| 6,393,533 B1 | * | 5/2002 | Mende et al. | 707/201 |

OTHER PUBLICATIONS

U.S. Patent Application. A Systems and Method for Maintaining and Recovering Data Consistency Across Multiple Instances of a Database. Inventors: Robert G. Mende, Jr. and Mayank V. Vasa. Application No. 09/730,618. Filing Date: Dec. 5, 2000. Art Unit: 2171. Examiner Assigned: Al Hashemi, Sana A.

U.S. Patent Application. A System and Method for Maintaining and Recovering Data Consistency in a Data Base Page. Inventor: Robert G. Mende, Jr. Application No. 09/730,988. Filing Date: Dec. 5, 2000.

* cited by examiner

*Primary Examiner*—Safet Metjahic
*Assistant Examiner*—Hanh Thai
(74) *Attorney, Agent, or Firm*—Sterne, Kessler, Goldstein & Fox, P.L.L.C.

(57) ABSTRACT

The present invention provides a system and method that facilitates data consistency maintenance between two segments of memory. A data consistency maintenance and recovery system and method of the present invention uses a dual page configuration and locking process to store and track data. A primary page is used as the primary data storage location and a mirror page operates as a copy of the primary page, except during certain stages of data manipulation operations. In one embodiment the present invention facilitates consistency maintenance during a write operation to a database. The present invention also facilitates data recovery following a system or process crash.

19 Claims, 10 Drawing Sheets

300

310
Comparing the access counter value of a primary page to the acess counter value of a mirror page.

320
Determine whether a primary page or its associated mirror page includes valid data.

330
Copying a consistent page to an inconsistent page.

340
Resolving genlock status.

510
Determining an appropriate primary page for comparision to a mirror page.

520
Resolving the data to be utilized as valid data when recovering from a process or system crash.

530
Restoring consistency.

Index 610

Primary Page 611
Element Location 0 Key[00] OID 10 [OID23, OID32]
Element Location 1 XXX
Element Location 2 Key[04] OID 11 [OID22, OID33]
Element Location 3 XXX

| 621 | Counter Value 631 |
|---|---|
| | 641 |

Primary Page 612
Element Location 0 XXX
Element Location 1 Key[03] OID 12 [OID21, OID34]
Element Location 2 XXX

| 622 | Counter Value 632 |
|---|---|
| | 642 |

Primary Page 613
Element Location 0 Key[02] OID 13 [OID24, OID31]
Element Location 1 XXX
Element Location 2 Key[01] OID 14 [OID20, OID30]
Element Location 3 XXX

| 623 | Counter Value 633 |
|---|---|
| | 643 |

Mirror Page 614
Element Location 0 Key[00] OID 10 [OID23, OID32]
Element Location 1 XXX
Element Location 2 Key[04] OID 11 [OID22, OID33]
Element Location 3 XXX

| 624 | Counter Value 634 |
|---|---|
| | 644 |

Mirror Page 615
Element Location 0 XXX
Element Location 1 Key[03] OID 12 [OID21, OID34]
Element Location 2 XXX

| 625 | Counter Value 635 |
|---|---|
| | 645 |

Mirror Page 616
Element Location 0 Key[02] OID 13 [OID24, OID31]
Element Location 1 XXX
Element Location 2 Key[01] OID 14 [OID20, OID30]
Element Location 3 XXX

| 626 | Counter Value 636 |
|---|---|
| | 646 |

Index 650

Primary Page 651
Element Location 0 Key[11] OID 20 [OID14, OID30]
Element Location 1 XXX
Element Location 2 Key[13] OID21 [OID 12, OID34]
Element Location 3 XXX

| 671 | Counter Value 681 |
|---|---|
| | 691 |

Primary Page 652
Element Location 0 XXX
Element Location 1 Key[14] OID 22 [OID11, OID33]
Element Location 2 XXX

| 672 | Counter Value 682 |
|---|---|
| | 692 |

Primary Page 653
Element Location 0 Key[10] OID 23 [OID10, OID32]
Element Location 1 XXX
Element Location 2 Key[12] OID 24 [OID13, OID31]
Element Location 3 XXX

| 673 | Counter Value 683 |
|---|---|
| | 693 |

Mirror Page 654
Element Location 0 Key[11] OID 20 [OID14, OID30]
Element Location 1 XXX
Element Location 2 Key[13] OID21 [OID 12, OID34]
Element Location 3 XXX

| 674 | Counter Value 684 |
|---|---|
| | 694 |

Mirror Page 655
Element Location 0 XXX
Element Location 1 Key[14] OID 22 [OID11, OID33]
Element Location 2 XXX

| 675 | Counter Value 685 |
|---|---|
| | 695 |

Mirror Page 656
Element Location 0 Key[10] OID 23 [OID10, OID32]
Element Location 1 XXX
Element Location 2 Key[12] OID 24 [OID13, OID31]
Element Location 3 XXX

| 676 | Counter Value 686 |
|---|---|
| | 696 |

FIG 6 ered an adverse effect on data consistency maintenance. If a system or process crashes in the middle of performing a write transaction the resulting data is typically unreliable and often invalid. Maintaining consistency across process transactions is critical for proper recovery from a process or system crash. If a read or write process (or the system that a write is happening on) crashes anytime during the transaction it is important for the consistency (e.g., of a database) to be maintained so that continuing processes receive valid information.

What is required is a system and method that facilitates data consistency maintenance during a write operation. The system and method should also facilitate recovery from a system or process crash with valid data.

SUMMARY OF THE INVENTION

The present invention is a system and method that facilitates data consistency maintenance between two segments of memory. In one exemplary implementation, the present invention facilitates consistency maintenance during a write operation to a database. The present invention also facilitates recovery from a system or process crash with valid data. A data consistency maintenance and recovery system and method of the present invention utilizes a dual page configuration and locking process to store and track data. A primary page is utilized as the primary data storage location and a mirror page operates as a copy of the primary page except during certain stages of a data manipulation operation (e.g., a write operation). In one embodiment of the present invention, a process can not access a page to perform a read operation if the page is locked and a process can not perform a write operation if the process did not lock the page.

In one embodiment of the present invention, a consistency maintenance locking method and an access tracking method are utilized to facilitate consistency maintenance of plurality of data buckets stored across multiple pages. In one embodiment of the present invention, data being manipulated is stored in buckets across multiple pages and chained together by a reference key (e.g., "KEY"). The present invention also facilitates recovery from a process or system crash. Read operations access information from unlocked primary pages. Consistency maintenance write operations access, lock and update a mirror page, then access, lock and update a primary page. Primary page and mirror page accesses are tracked (e.g., counted). Then a consistency maintenance write operation unlocks and syncs the primary page and mirror page to disk. A page with consistent data is copied to a page with inconsistent data during a process system crash recovery. In one embodiment of the present invention, a primary page is considered consistent if a write operation has not accessed the primary page to begin a write process, otherwise data on a mirror page is considered consistent. In one embodiment of the present invention, a write operation is dropped or continued upon determination that data is inconsistent when recovering from a process or system crash.

BRIEF DESCRIPTION OF THE DRAWINGS

FIG. 3 is a flow chart of one embodiment of a present invention data consistency recovery method in which data being modified is included on a single page.

FIG. 5 is a flow chart of a data consistency recovery method of one exemplary implementation of the present invention in which information buckets are spread across multiple pages.

FIG. 6 is a block diagram illustrating one exemplary present invention configuration of information stored in multiple index database system.

DETAILED DESCRIPTION OF THE INVENTION

Figure 1A:
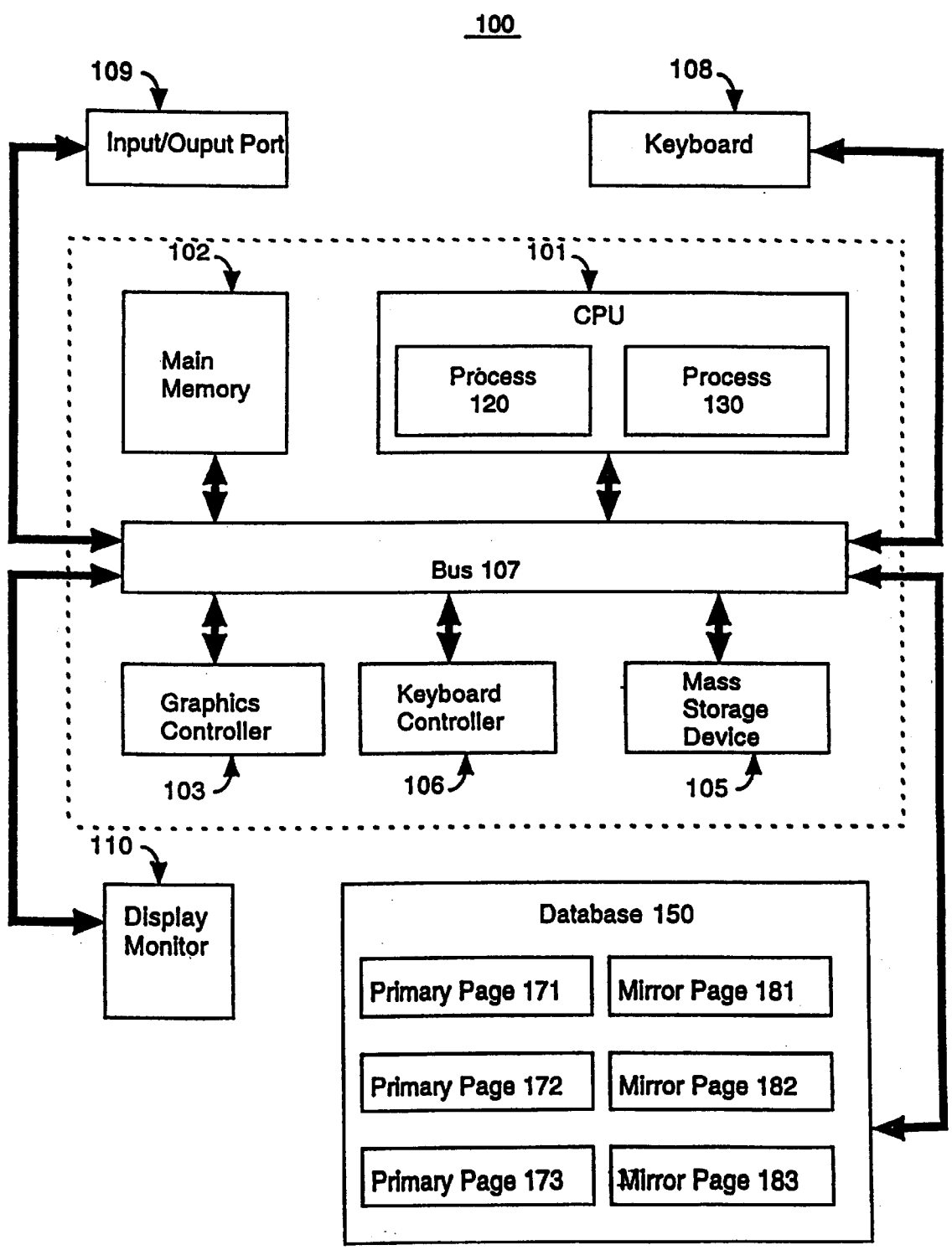
FIG. 1A is a block diagram of a data consistency maintenance and recovery computer system of the present invention.

Reference will now be made in detail to the preferred embodiments of the invention, a method and system for maintaining and recovering data consistency in a computer system database, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention is a data consistency maintenance and recovery system and method. In one embodiment of the present invention, a data consistency maintenance and recovery computer system implements a data consistency maintenance method and a data consistency recovery method. In one exemplary embodiment, information is stored in a page based memory mapped, multiple anonymous reader, multiple writer database such as a memory mapped database memory (MDBM). A data consistency maintenance and recovery system and method of the present invention facilitates the reduction of data corruption by process or system crashes that occur during a write procedure. The present invention performs either a roll back or completion of changes to a page being modified during an aborted transaction, depending at which point in the modification process (e.g., write operations) the failure occurred. In one embodiment of the present invention, external transaction logs are not required.

FIG. 1A is a block diagram of a data consistency maintenance and recovery computer system 100, one embodiment of the present invention. In general, computer system 100 comprises a central processing unit (CPU) 101, a main memory 102, graphics controller 103, mass storage device 105, keyboard controller 106, network 108, input/output port 109, database 150 and display monitor 110, all of which are coupled to bus 107. CPU 101 handles most of the control and data processing including processes 120 and 130. Main memory 102 provides a convenient method of storing data for quick retrieval by CPU 101. Graphics controller 103 processes image data in pipelined stages. Mass storage device 105 stores data associated with multiple images and applications. Keyboard controller 106 controls keyboard 108, which operates as an input device. Input/output port 109 provides a communication port for a variety of devices. In one exemplary implementation of the present invention, input/output port 109 provides a communication port to a network of devices (not shown). Display monitor 110 displays graphical images. Database 150 stores information arranged in files on a computer readable medium, including records comprising fields for facilitating operations such as searching, sorting, reconfiguring, etc. Bus 107 provides a communication path between components of computer system 100.

In one embodiment of the present invention, database 150 is a memory mapped data base (MDBM) that facilitates multiple anonymous untrusted readers and multiple writers inside an unmanaged shared memory database. In one exemplary implementation of the present invention, a MDBM uses memory mapped files to give memory semantics to a file enabling the data that is accessed from main memory and the data on a file in a database to appear the same to multiple processes accessing the data. In one embodiment of the present invention, for every "primary" page of data in the MDBM a "mirror" page of that data is kept.

Figure 1B:
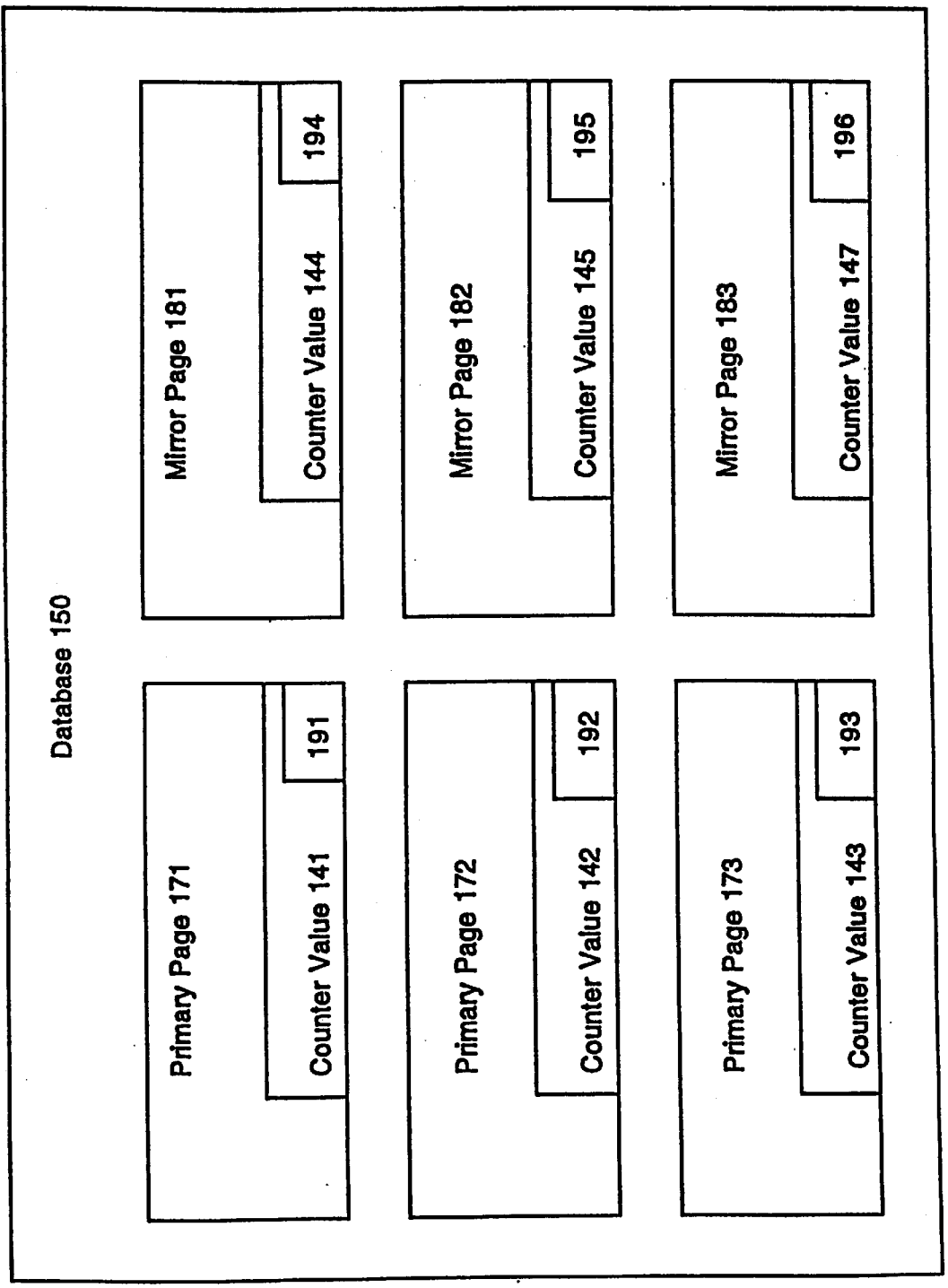
FIG. 1B is a block diagram illustrating one exemplary configuration of pages maintained in a database of the present invention.

FIG. 1B is a block diagram illustrating one exemplary configuration of pages maintained in database 150 by one embodiment of the present invention. Each of the primary pages 170 through 173 has a mirror page 181 through 183 respectively. A mirror page is essentially a copy of the primary page and comprises the same data except for certain short periods of time during a write operation when a mirror page is written to first. During the initial stages of a write operation, the mirror page comprises "new" data and a primary page includes "old" data. Each page 170 through 183 includes a genlock that comprises a write counter value 141 through 146 respectively with a low order bit 191 through 196 respectively which serve as a lock bit. The genlock indicates a page is locked or unlocked. In one embodiment of the present invention, a page is locked during operations associated with manipulation of data included in the page (e.g., consistency maintenance write operations). A page is unlocked if data on the page is not being manipulated. If the page is locked (e.g., a genlock's low order bit is set to a logical 1) the page is not available to be accessed by a read operation or accessed by a write operation that did not lock it. If the page is unlocked (e.g., a genlock's low order bit is set to a logical 0) the page is available to be read or write access.

In one embodiment of the present invention, the logical state of the lowest order bit of the write counter value indicates if the page is locked or unlocked. In one exemplary implementation, a logical 1 write counter value low order bit indicates the page is locked and a logical 0 write counter value low order bit indicates the page is unlocked. In one embodiment of a present invention genlock, when a page is initially accessed in a write operation, the write counter value is incremented and the low order bit changes from a logical 0 value to a logical 1 value indicating the page is locked by a process (e.g. process 120 performing a write operation). In one embodiment of the present invention, write counter values are not incremented during bit wrap-around when it's maximum unit (e.g., MAX_UNIT) size is passed. Once the page is locked read operations and other write operations are prevented from accessing the data. When the process has completed the write operations the write counter value is incremented and the low order bit changes from a logical 1 to a logical 0 indicating the page is unlocked. In one embodiment of the present invention, read operations do not require the genlock to be locked since they just read data and do not manipulate it, therefore they do not have the potential to disrupt the consistency or validity of the data.

In one embodiment of the present invention, processes (e.g., process 120 or 130) access a primary or mirror page depending upon the type of operation. In one embodiment of the present invention, read operations access the primary page to obtain data and do not lock a page (e.g., do not increment the write counter value). In one exemplary implementation, write operations first access and modify data in the mirror page and then access and modify data in the primary page. The write operation does lock a page when it begins a write and unlocks it when it is finished.

Figure 2:
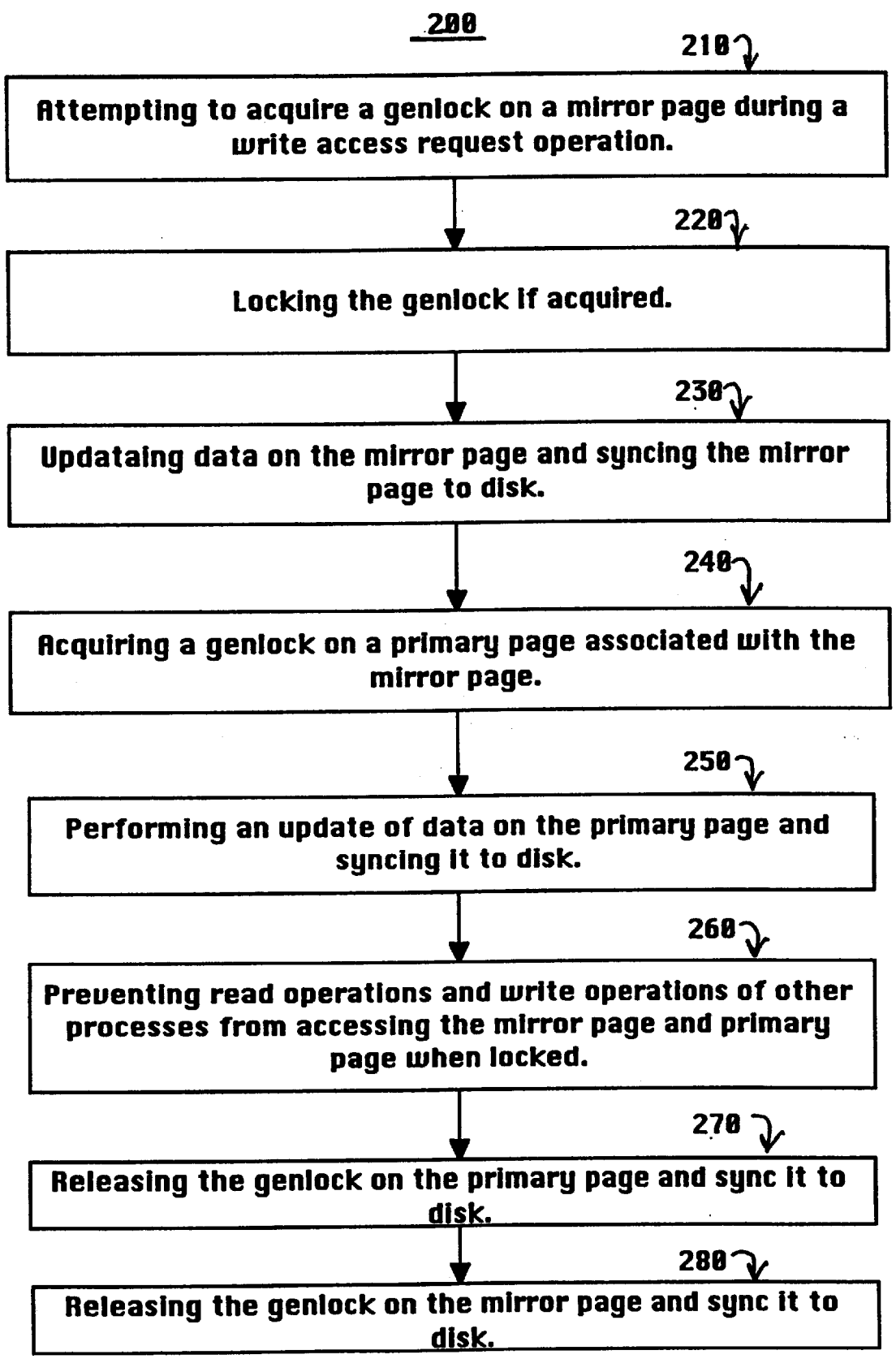
FIG. 2 is a flow chart of one embodiment of a present invention data consistency maintenance method in which data being modified is included on a single page.

FIG. 2 is a flow chart of data consistency maintenance method 200, one embodiment of the present invention. Data consistency maintenance method 200 utilizes a genlock to prevent reads from accessing data in the process of being changed by a write operation. The genlock for a mirror page and it's associated primary page are kept in lockstep, except during portions of a write operation. In one embodiment of the present invention, data subject to a write operation is stored in a single primary page and a copy of the data is stored in its associated mirror page. In one embodiment of the present invention, data consistency maintenance method 200 is implemented on a computer system (e.g., data consistency maintenance and recovery computer system 100).

In step 210 a process (e.g. process 120) requests write access to a particular mirror page (e.g., mirror page 181) and attempts to acquire a genlock on that page. The write access request is denied if the genlock of that particular mirror page is locked (e.g., low order bit 194 is a logical 1 value). The write access request is granted if the genlock of that particular mirror page is unlocked (e.g., low order bit 194 is a logical 0 value). In one embodiment of the present invention, the particular mirror page (e.g., mirror page 181) is retrieved from a database (e.g., database 50) and mapped into a local or main memory (e.g., main memory 102) if not already stored in the local or main memory.

If the write access request is granted and a genlock is acquired, the requesting process (e.g., process 120) locks the genlock (e.g., the write counter value is incremented) and the mirror page is synced to disk in step 220. Locking the genlock provides an indication that the mirror page (e.g., mirror page 181) is being accessed by a process performing a manipulation of the data included in the mirror page (e.g., a write operation). In one embodiment of the present invention, the genlock indication is provided by the least significant bit of the write counter being in a logic level "1" state.

In step 230, the data included in a mirror page is updated and the mirror page is synced to disk. In one embodiment of the present invention, syncing operations are to a backing store or some common point. In one exemplary implementation, syncing operations include a network transaction.

In step 240, data consistency maintenance method 200 acquires the genlock on the primary page and syncs the primary page to disk. In one embodiment of the present invention, the genlock is locked when it is synced back to disk (e.g., incrementing a write counter value).

Data consistency maintenance method 200 performs an update of data on the primary page and syncs the primary page to disk, in step 250.

In step 260, read operations and write operations of other processes (e.g., process 130) are prevented from accessing a locked page. For example, a second process (e.g., process 130) attempting to access a locked page (e.g., primary page 171) checks a genlock indication (e.g., low order bit 191) of the particular page (e.g., page 171) and determines that the page is locked (e.g., the least significant bit of write counter value 141 is in the logic level "1" state). The second process (e.g., process 130) waits to read or write access the particular page (e.g., page 171) until the second process determines the particular page is unlocked (e.g., a logic level "0" state in the least significant bit of write counter value 141). Upon determining the mirror page is unlocked, the second process accesses the particular page to perform an operation (e.g., a read or write operation).

In step 270, data consistency maintenance and recovery method 200 releases the genlock on the primary page and syncs the primary page to disk. In one embodiment of the present invention the genlock is released by incrementing a write counter value associated with the primary page.

In step 280, data consistency maintenance method 200 releases the genlock on the mirror page and syncs the mirror page to disk.

FIG. 3 is a flow chart of data consistency recovery method 300, one embodiment of the present invention. Data consistency recovery method 300 facilitates the recovery of consistent data after a process or system crash. The method permits a process that is performing data manipulation (e.g., a write operation) in a database to determine what data is consistent (all writes completed successfully) and what data is not consistent following a process or system crash. In one embodiment of the presentation, data consistency recovery method 300 allows any arbitrary process performing a write operation to either complete or abort the transaction that crashed. In one embodiment of the present invention, data consistency recovery method 300 is implemented in a system (e.g., data consistency maintenance and recovery computer system 100) utilizing a data consistency maintenance method (e.g., data consistency maintenance method 200).

In step 310, the write counter value of a primary page is compared to the write counter value of a mirror page and the comparison is an atomic operation. In one embodiment of the present invention, data consistency recovery method 300 utilizes the comparison to establish if the genlocks of the respective pages are locked or unlocked. In one embodiment of the present invention, data consistency recovery method 300 also utilizes the comparison to determine if the write counter value of a primary page is equal to or less than the write counter value of an associated mirror page.

In step 320, data consistency recovery method 300 determines which pages include valid data. If the write counter values of both the primary page and mirror page are equal and they are both unlocked (e.g., the genlock is a logical 0 value) then the data on both the pages is considered valid and consistent. The information on the primary page is considered consistent if the write counter value of the primary page is less than the write counter value of the mirror page and the primary page is unlocked and the mirror page is locked. The information on the mirror page is consistent if the write counter value of the primary page is equal to the writecounter value of the mirror page and the primary page and the mirror page are locked. The information on the mirror page is consistent if the write counter value of the primary page is greater than the write counter value of the mirror page and the primary page is unlocked and the mirror page is locked. The pages are considered to be in an invalid state if the primary page is locked and the mirror page is unlocked. The pages are also considered to be in an invalid state if the write counter value on both the primary and mirror pages are equal. When an invalid state occures data included in the mirror page is considered the valid information.

In step 330 of data consistency recovery method 300, the consistent page is copied to the inconsistent page and genlock status resolved. In one exemplary implementation of the present invention the genlock status is resolved by unlocking the genlocks on both the primary page and the mirror page. In one embodiment of the present invention in which the lowest order bit of a write counter value functions as a genlock indication, the writecounter values in a primary page and its associated mirror page are manipulated to equal one another after a recovery and consistency process is performed.

In one embodiment of the present invention, data is stored across multiple pages. In one exemplary implementation of the present invention a database (e.g., a MDBM) allows for storage of relatively large size data. The database breaks the data into "buckets" of various sizes that are stored over multiple pages. The data buckets are "chained" together and referenced by a key (e.g., KEY) comprising an appended bucket identification (ID). In one embodiment of the present invention, the key is a mono atomically increasing unsigned integer. When the data is retrieved the parts or buckets of data are coalesced back together again. In one exemplary implementation it is possible that more than one bucket of data will be on the same database page and the database (e.g., MDBM) assigns them an element location (e.g., an unsigned integer).

Figure 4A:
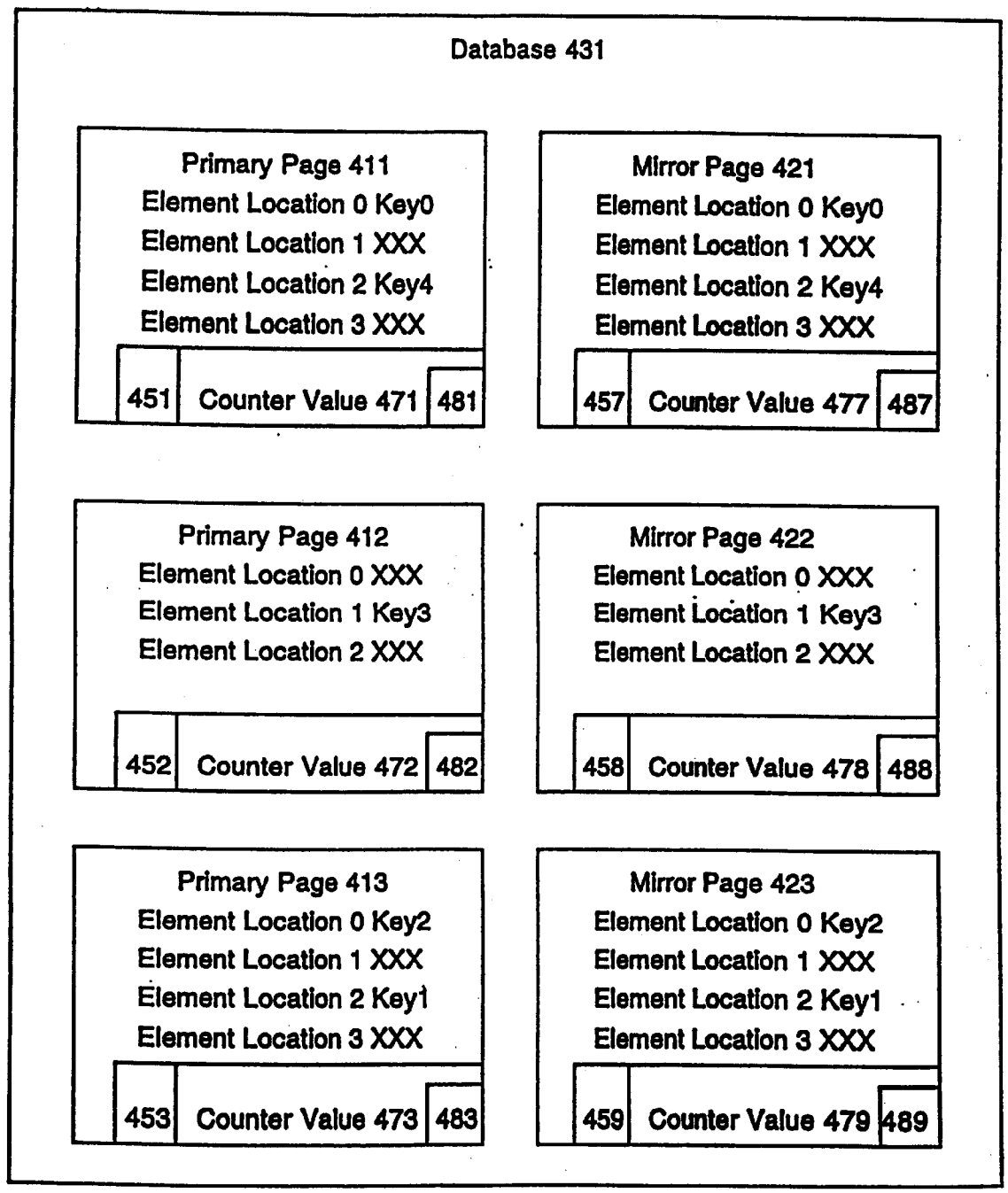
FIG. 4A is a block diagram illustrating one exemplary configuration of pages maintained in database by the present invention.

FIG. 4A is a block diagram illustrating one exemplary configuration of pages maintained in database 450, one embodiment of the present invention. Database 450 comprises primary pages 411 through 413 and their associated mirror pages 421 through 423 respectively. In one embodiment of the present invention, database 450 is a MDBM database. A data value is broken into buckets identified by a reference to "KEY" and an appended identification (e.g., KEY0, KEY1, KEY2, KEY3 and KEY4). The buckets of the data value referenced by "KEY" are stored over several pages including primary page 411 through 413 and copies stored in mirror pages 421 through 423. Each bucket starts at an ordinal element location (e.g., element location 0, 1, 2, etc.) within a page. In one embodiment of the present invention, an element location corresponds to a memory location or address offset within each page. Primary pages 411 through 413 and mirror pages 421 through 423 include writecounter values 471 through 479, low order bits 481 through 489 and atomic consistency elements 451 through 459. In one embodiment of the present invention, the atomic consistency element values on the primary pages are set to a logical 0 value and do not change. The atomic consistency element values on the mirror page are set to correspond to an element location of a bucket (e.g., KEY[M]) being modified when the mirror page genlock is locked and returned to a logical zero when the mirror page genlock is unlocked.

Figure 4B:
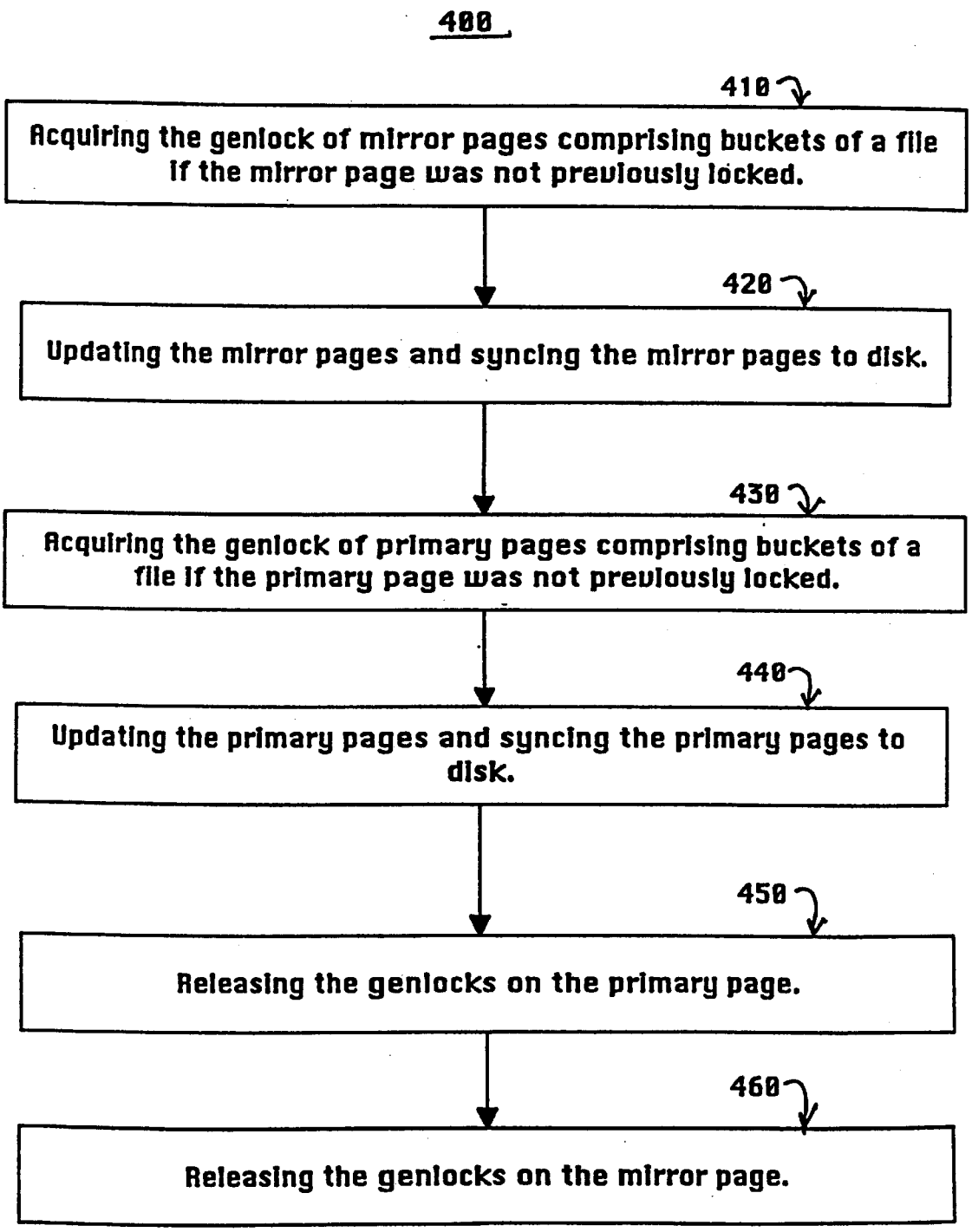
FIG. 4B is a flow chart of a data consistency maintenance method for information buckets spread across multiple pages, one embodiment of the present invention.

FIG. 4B is a flow chart of data consistency maintenance method 400, one embodiment of the present invention. Data consistency maintenance method 400 is a method for ensuring consistency in bucket chained data across multiple pages of a page based memory mapped, multiple anonymous reader, multiple writer database (e.g., a MDBM). One embodiment of data consistency maintenance method 400, includes the genlock and consistency method described above. In one exemplary implementation of data consistency maintenance method 400, a process performing a write operation updates relevant mirror pages (e.g., mirror pages comprising data modified by a write operation), then updates the relevant primary pages, and then returns the database to standard unlocked state. In one embodiment of the present invention, consistency state changes happen in an atomic manner. The nomenclature key [M] refers to bucket number M of a data value referenced by the key. In one embodiment of the present invention, data consistency maintenance method 400 is implemented on a computer system (e.g., data consistency maintenance and recovery computer system 100).

In step 410, for each M in 0 through N, where N is the number of buckets that the value associated with a key has been split into, the writing process acquires and locks the genlock of the mirror page for key [M] (e.g., as described above by incrementing an writecounter value), if the page was not previously locked. When locking the genlock, if M is greater than 0, the atomic consistency element for this page is set to the element location on the mirror page for key[M]. Each accessed mirror page is locked and synced to disk if the writer acquired the genlock.

In step 420, for each M in 0 through N, where N is the number of buckets that the value associated with a key has been split into, the writing process updates the mirror page and syncs the page to disk. An optimization of deferring the syncs until after all the pages have been updated allows coalescing the syncs of multiple buckets on the same page.

In step 430, for each M in 0 through N, where N is the number of buckets that the value associated with a key has been split into, the writing process acquires and locks the genlock of the primary page for key [M] if the page was not previously locked. Each page is synced to a backing store (e.g.,a disk) if the writer acquired the genlock.

In step 440, for each M in 0 through N, where N is the number of buckets that the value associated with a key has been split into, the writing process updates the primary page and syncs the page to disk. In one embodiment of the present invention, an optimization of deferring the syncs until after all the pages have been updated allows coalescing the syncs of multiple buckets on the same page.

In step 450, for each M in 0 through N, where N is the number of buckets that the value associated with a key has been split into, the writing process releases (unlocks) the genlock on the primary page and syncs the primary page to disk.

In step 460, for each M in 0 through N, where N is the number of buckets that the value associated with a key has been split into, then the writing process releases the genlock and sets the atomic consistency element to 0 on the mirror page and syncs the mirror page to disk.

FIG. 5 is a flow chart of data consistency recovery method 500, one embodiment of the present invention. Data consistency recovery method 500 is a method for recovering valid bucket chained data across multiple pages of a page based memory mapped, multiple anonymous reader, multiple writer database. In one embodiment of the present invention, data consistency recovery method 500 compares the genlocks and count of a mirror page with the appropriate primary page genlock and count to restore consistency. In one exemplary implementation, data consistency recovery method 500 allows for either roll back or completion of the changes to pages in an atomic manner. Whether the data is rolled back after an aborted transaction depends upon the point in the modification operation where the failure occurred. In one embodiment of the present invention, data consistency maintenance method 400 allows a database (e.g., a MDBM) to reduce corruption of data (e.g., data stored in multiple elements in a MDBM) associated with a process or system crash that occures during a write process. In one embodiment of the present invention, data consistency recovery method 500 is implemented in a system (e.g., data consistency maintenance and recovery computer system 100) utilizing a data consistency maintenance method (e.g., a flow chart of data consistency maintenance method 400).

In Step 510 an appropriate primary page for comparison to a mirror page is determined. In one embodiment of the present invention, an atomic consistency element is examined and utilized to determine an appropriate primary page for comparison to a mirror page. If the atomic consistency element is zero, then the primary page associated with key[M] is the appropriate primary page for comparison. If the atomic consistency element is not zero the primary page associated with key[0] is appropriate, where the atomic consistency element refers to key[M]. In one embodiment of the present invention, if the atomic consistency element is non zero, then that nonzero atomic consistency element value is utilized as an ordinal value to determine which key[M] (e.g., "KEY[3]") is being referenced. The non zero atomic consistency element value is also utilized to determine which page the initial key[0] is on (e.g., "KEY[0]"). The genlock of the primary page including the initial key (e.g., KEY[0]) is used to override the genlock value of the primary page that includes a key[M]. This permits a change state to occur across the pages that include a key[M] and thereby performs an atomic change.

In step 520, the page with data to be utilized as valid data when recovering from a process or system crash is resolved by comparing the genlock of a mirror page to the genlock of an appropriate primary page determined in step 510. If the genlock of both the appropriate primary page and the mirror page are unlocked, and the counter values are equal, then the data on both pages is consistent. If the genlock of the appropriate primary page is unlocked and the mirror page is locked, and the write counter value of the primary page is less than the write counter value of the mirror page, then the appropriate primary page comprises valid data. If the genlocks of the appropriate primary page and the mirror page are locked and the write counter value of the primary page and the write counter value of the mirror page are equal, then the mirror page comprises valid data. If the genlock of the appropriate primary page is unlocked and the mirror page is locked, and the write counter value of the primary page is less than the counter value of the mirror page, then the appropriate primary page comprises valid data. If the genlock of the appropriate primary page is unlocked and the mirror page is locked, and the write counter value of the primary page is greater than the counter value of the mirror page then the mirror page comprises valid data. An invalid state exists if the genlock of the appropriate primary page is locked and the mirror page is unlocked, and the data on the mirror page is considered valid and consistent.

In step 530 the consistency is restored by copying the invalid (inconsistent) page with the valid (consistent) page. To restore consistency, genlocks on the mirror and primary pages must be acquired. In one embodiment of the present invention, acquiring a genlock on a locked genlock increases it by 2. Genlocks on the primary and mirror pages are then released. At the end of this process the associated primary and mirror genlocks will be equal.

Implementing data consistency maintenance method 400 and data consistency recovery method 500 together facilitates access to valid data and assurance that the data on a disk (e.g., a MDBM) is accessed in a consistent manner. Thus, when a process performs a read of data, the returned data is valid even if there is a system or software crash during an update of the database. The method also allows for a process that is performing a write operation in the database to determine what data is consistent (all writes completed successfully) and what data is not consistent. In one embodiment of the present invention data consistency maintenance method 400 and data consistency recovery method 500 allow an arbitrary process performing a write operation to either complete or abort the transaction that crashed.

In one embodiment of the present invention data is stored across multiple instances of a page based memory mapped, multiple anonymous reader, multiple writer database (e.g., a MDBM). In one exemplary implementation of the present invention, a MDBM allows for storage of multiple indexes onto the same data. In one embodiment of the present invention, storage of multiple indexes onto the same data is accomplished by storing the primary data in one database and each index stored in its own MDBM database. In one exemplary implementation of the present invention, the storage of the data and the indexes may be of a nearly unlimited size. The value associated with a value that has a multi-key index is (implicitly) index 0. The values of the indexes are lists of keys for index 0.

FIG. 6 is a block diagram illustrating one exemplary configuration of information stored in multiple index database system 600, one embodiment of the present invention. Multiple index database system 600 comprises index 610, index 650 and a third index (not shown). In one embodiment of the present invention, index 610, index 650 and a third index (not shown) are stored in separate databases. In one embodiment of the present invention, the indexes are stored in MDBM databases.

Index 610 comprises primary pages 611 through 613 and their associated mirror pages 614 through 616 respectively. A data value is broken into buckets identified by a reference to "KEY" and an appended identification (e.g., KEY00, KEY01, KEY02, KEY03 and KEY04). The first number in the appended identification is a reference to an index and the second number is a reference to the bucket number of that index. The buckets of data value referenced by "KEY" are stored over several pages including primary page 611 through 613 and copies stored in mirror pages 614 through 616. Each bucket starts at an ordinal element location (e.g., element location 0, 1, 2, etc.) within a page. Primary pages 611 through 613 and mirror pages 614 through 616 include write counter values 631 through 636, genlocks 641 through 646 and atomic consistency elements 621 through 626. In one embodiment of the present invention, the atomic consistency element values on the primary pages are set to a logical 0 value and do not change. The atomic consistency element values on the mirror page are set to correspond to an element location of a bucket (e.g., key[I,M]) being modified when the mirror page genlock is locked and returned to a logical zero when the mirror page genlock is unlocked.

Index 650 comprises primary pages 651 through 653 and their associated mirror pages 654 through 656 respectively. A data value is broken into buckets identified by a reference to KEY and an appended identification (e.g., KEY00, KEY01, KEY02, KEY03 and KEY04). The first number in the appended identification is a reference to an index and the second number is a reference to the bucket number of that index. The buckets of the data value referenced by "KEY" are stored over several pages including primary page 651 through 653 and copies storied in mirror pages 654 through 656. Each bucket starts at an ordinal element location (e.g., element location 0, 1, 2, etc.) within a page. primary pages 651 through 653 and mirror pages 654 through 656 include write counter values 681 through 686, low order bits 691 through 696 and atomic consistency elements 671 through 676. In one embodiment of the present invention, the atomic consistency element values on the primary pages are set to a logical 0 value and do not change while the atomic consistency element values on the mirror page are set to correspond to an element location of data being modified (e.g., key[I,M]) when the mirror page genlock is locked and returned to a logical zero when the mirror page genlock is unlocked.

Each bucket key [I,M] included in primary pages of a particular index has a primary object identifier (OID) associated with that index. In one exemplary implementation of the present invention, each primary object identifier is a unique value assigned to a bucket of value Key referenced in a particular index. Each bucket key [I,M] includes a list of secondary primary object identifiers that reference information in another index that should remain consistent with the value in bucket key [I,M]. For example, bucket KEY [01] of index 610 comprises particular data (e.g., a phone number) that is also included in bucket KEY [11] of index 650. Thus, the OID list included in Key 01 comprises a reference to OID20, the OID of index 650 associated with the particular information to the method maintains consistency for across both indexes.

In one embodiment of the present invention, a primary index comprises primary keys. In one exemplary implementation of the present invention, a primary key identifies a record in a table and has a value other than null. The primary keys (e.g., KEY [03]) of the primary index (e.g., index 610) are linked to a foreign key (e.g., KEY[13]) in another table (e.g., index 650). The foreign key (e.g., KEY[13]) is an attribute that serves as the primary key (e.g., KEY[13]) of the other table (e.g., index 650) in the database.

Figure 7:
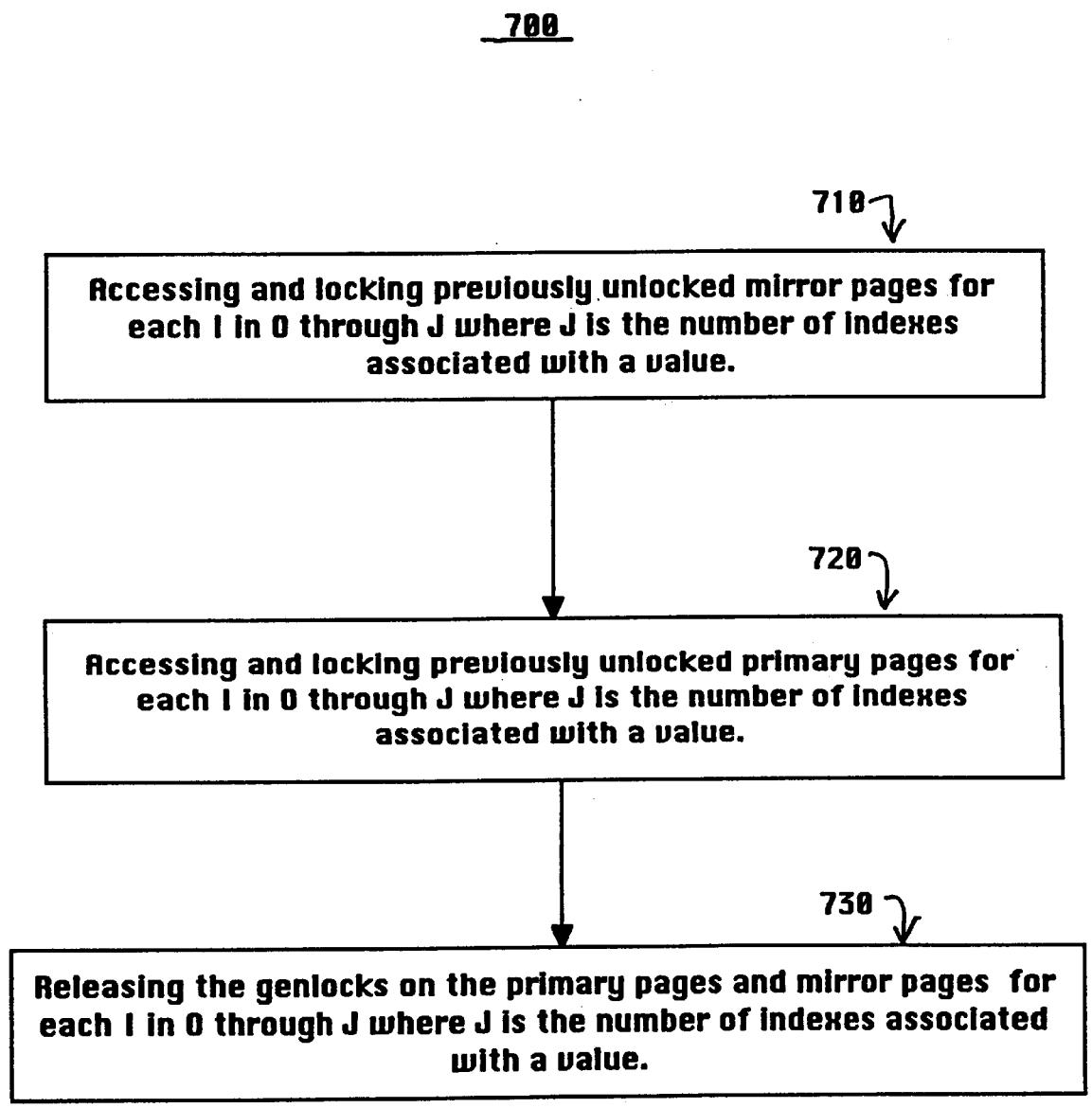
FIG. 7 is a flow chart of a data consistency maintenance method for multiple instances, one embodiment of the present invention.

FIG. 7 is a flow chart of data consistency maintenance method 700, one embodiment of the present invention. Data consistency maintenance method 700 is a method for ensuring consistency of data stored across multiple instances of a page based memory mapped, multiple anonymous reader, multiple writer database (e.g., a MDBM). In one embodiment of the present invention, data consistency maintenance method 700 includes genlock and consistency methods for a single page and bucket chained data over multiple pages discussed above. In one embodiment of the present invention, data consistency maintenance method 700 is implemented on a computer system (e.g., data consistency maintenance and recovery computer system 100).

In data consistency method 700 a writer updates the mirror pages then updates the primary pages of databases for supplied indexes, then returns the databases to standard state. In one embodiment of the present invention, consistency state changes happen in an atomic manner. A small value is stored in conjunction with the MDBM genlock called the atomic consistency element. The nomenclature key[I] refers to the index I. The nomenclature key[I, M] refers to key (index) number I and bucket number M of that key.

In step 710, for each I in 0 through J, where J is the number of indexes associated with a value (e.g., referenced by KEY), the genlocks of previously unlocked mirror pages comprising information associated the value of indexed data are accessed and locked while updates to the information are performed and updated pages are synced to disk. In one embodiment of the present invention, step 710 is performed in two parts comprising step 711 and 713.

In step 711, for each M in 0 through N, where N is the number of buckets that the value associated with key[I] has been split into, the writing process acquires the genlock of the mirror page for key[I, M] (as described above), if the page was not previously locked. When modifying the genlock the atomic consistency element for this page is set to the element location for key[I, M] if M is greater than 0. Each page is synced to disk if the writer acquired the genlock.

In step 712, for each M in 0 through N, where N is the number of buckets that the value associated with key[I] has been split into, the writing process updates the mirror page and syncs the page to disk. If M equals 0 and I is greater 0, then the atomic consistency element is set to refer to key[I, M] and the update ensures that the first value (referring to index 0) listed is that of key[0]. In one embodiment of the present invention, an optimization deferring the syncs on a per database basis until after all the pages have been updated allows coalescing the syncs of multiple buckets on the same page.

In step 720, for each I in 0 through J, where J is the number of indexes associated with a value, the genlocks of previously unlocked primary pages comprising information associated the value are accessed and locked while updates to the information are performed and updated primary pages are synced to disk. In one embodiment of the present invention step 720 is performed in two parts comprising step 721 and 723.

In step 721, for each M in 0 through N, where N is the number of buckets that the value associated with key[I] has been split into, the writing process acquires the genlock of the primary page for key[I, M] if the page was not previously locked. Each page is synced to disk if the writer acquired the genlock.

In step 723, for each M in 0 through N, where N is the number of buckets that the value associated with key[I] has been split into, the writing process updates the primary page and syncs the page to disk. In one embodiment of the present invention, an optimization deferring the syncs on a per database basis until after all the pages have been updated allows coalescing the syncs of multiple buckets on the same page.

In step 730, for each I in 0 through J, where J is the number of indexes associated with a value, the writing process releases the genlocks on the primary pages and the mirror pages and syncs them to disk. In one embodiment of the present invention, step 630 is performed in two steps, 731 and 733.

In step 731, for each M in 0 through N, where N is the number of buckets that the value associated with key[I] has been split into, the writing process releases the genlock on the primary page and syncs the page to disk.

In step 733, for each M in 0 through N, where N is the number of buckets that the value associated with a key has been split into, the writing process releases the genlock and sets the atomic consistency element to 0 on the mirror page and syncs the page to disk.

Data consistency method 700 guarantees that data that in memory is valid and the data on the disk is accessed in a consistent manner. Thus, when a process performs a read of data, the returned data is valid even if there is a system or software crash during an update of the database. The method also allows for a process that is performing a write in the database to determine what data is consistent (all writes completed successfully) and what data is not consistent. It also allows any arbitrary writer to either complete or abort the transaction that crashed.

Figure 8:
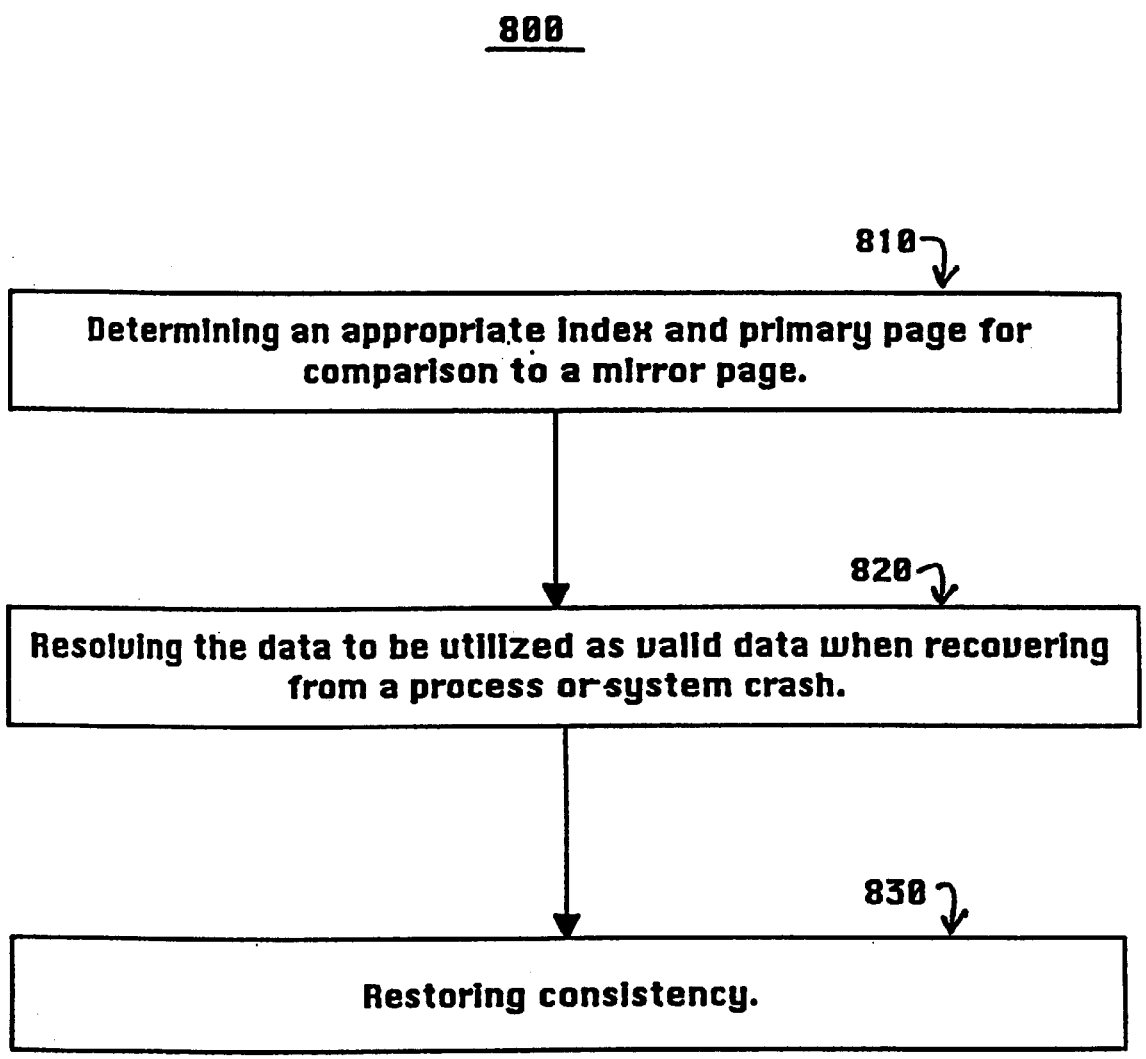
FIG. 8 is a flow chart of a data consistency recovery method for multiple instances, one embodiment of the present invention.

FIG. 8 is a flow chart of data. consistency recovery method 800, one embodiment of the present invention. Data consistency recovery method 800 is a method for recovering valid bucket chained data across multiple pages of a page based memory mapped, multiple anonymous reader, multiple writer database (e.g., a MDBM). In one embodiment of the present invention, data is stored in multiple instances of MDBM files and not corrupted by process or system crashes that occur during a write process. In one embodiment of the present invention, data consistency recovery method 800 facilitates either roll back or completion of the changes to the pages in multiple MDBM databases in an atomic manner. Whether the data is rolled back after an aborted transaction depends upon point in the modification operation where the failure occurred. In one embodiment of present invention, data consistency recovery method 800 compares the genlocks of a mirror page with the appropriate primary page genlock to restore consistency. In one embodiment of the present invention, data consistency recovery method 800 is implemented in a computer system (e.g., data consistency maintenance and recovery computer system 100) utilizing a data consistency maintenance method (e.g., data consistency maintenance method 200).

In step 810 an appropriate index and primary page for comparison to a mirror page is determined. If the atomic consistency element is zero, then the primary page key[M] is the appropriate primary page for comparison. If M is greater than 0 the primary page associated with key[I, 0] is appropriate, where the atomic consistency element refers to key[I, M]. Otherwise, the genlock is composed of primary page genlock key[I, M] logically "or-ed" with the low order bit of the primary genlock of key[0,0] of the first value in the value of key[I,0].

In one embodiment of the present invention, each page includes a second constructed genlock. A second constructed genlock is zero if the atomic consistency element is zero. A second constructed genlock is constructed if the atomic consistency element of a key in a given index I is non zero. That nonzero atomic consistency element value is utilized as an ordinal value to determine which key[I,M] (e.g., "KEY [13]") is being referenced and utilize that key[I,M] (e.g., "KEY[13]") to determine which page the initial key[I,0] is on (e.g., "KEY[I,0]"). The genlock of the primary page including the initial key (e.g., KEY[I,0]) is used to override the genlock value of the primary page that includes key[I, M]. This permits a change state to occur across the pages that include key[I,M] and thereby performs an atomic change.

In step 820 the page with data to be utilized as valid data when recovering from a crash is resolved. by comparing the genlock of a mirror page to the genlock of an appropriate primary page determined in step 810. If the genlock of both the appropriate primary page and the mirror page are unlocked and the counter values are equal then the data on both pages are consistent. If the genlock of the appropriate primary page is unlocked and the mirror page is locked and the write counter value of the primary page is less than the counter value of the mirror page then the appropriate primary page comprises valid data. If the genlocks of the appropriate primary page and the mirror page are locked and the write counter value of the primary page and the write counter value of the mirror page are equal then the mirror page comprises valid data. In the genlock of the appropriate primary page is unlocked and the mirror page is locked and the write counter value of the primary page is less than the counter value of the mirror page then the appropriate primary page comprises valid data. In the genlock of the appropriate primary page is unlocked and the mirror page is locked and the write counter value of the primary page is greater than the counter value of the mirror page then the mirror page comprises valid data. An invalid state exists if the genlock of the appropriate primary page is locked and the mirror page is unlocked. If an invalid state exists the data on the mirror page is considered valid and consistent.

In step 830 the consistency is restored by copying the invalid (inconsistent) page with the valid (consistent) page. To restore consistency, genlocks on the mirror and primary pages must be acquired. In one embodiment of the present invention, acquiring a genlock on a locked genlock increases it by 2. Genlocks on the primary and mirror pages are then released. At the end of this process the associated primary and mirror genlocks will be equal.

A data maintenance and recovery system and process of the present invention comprises a variety of implementations in which consistency is maintained between two segments of data. In one exemplary implementation of the present invention, a data maintenance and recovery system and method is utilized to maintain and recover data consistency throughout distributed resources. In one embodiment, the present invention is utilized to maintain and recover data consistency in network communications. In one embodiment of the present invention, syncs are performed to a backing store or common point.

Thus, the present invention is a system and method that facilitates data consistency maintenance including during a write operation. The present invention also facilitates recovery from a system or process crash with valid data. A data consistency maintenance system and method of the present invention is adaptable for implementations maintaining data consistency throughout data on a single page, in buckets distributed over multiple pages and multiple data base instances of data referenced by multiple indexes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer implemented data consistency maintenance method for maintaining consistency of a plurality of data buckets stored in multiple pages, comprising the steps of:

attempting to acquire a genlock on a mirror page comprising a mirror bucket of data associated with a particular value during a write access request operation;

locking said genlock if acquired;

updating said mirror bucket of data on said mirror page;

syncing said mirror page to backing store;

acquiring a genlock on a primary page associated with said mirror page;

performing an update on said primary page of a primary bucket of data associated with said particular value;

syncing said primary page to backing store;

preventing read operations and write operations of other processes from accessing said mirror page and said primary page while locked; and releasing said genlock on said primary page and said genlock on said mirror page.

2. A data consistency maintenance method of claim 1 further comprising the steps of keeping said mirror page and said associated primary page in lockstep except during a write operation.

3. A data consistency maintenance method of claim 1 further comprising the step of granting an attempt to acquire a genlock if it is unlocked.

4. A data consistency maintenance method of claim 1 further comprising the steps of:

retrieving said mirror page from a database; and mapping said mirror page into a local memory if not already stored in said local memory.

5. A data consistency maintenance method of claim 1 further comprising the steps of:

utilizing a genlock comprising a write counter with a low order bit indicating a genlock state; and incrementing said write counter each time a write access is performed.

6. A data consistency maintenance method of claim 1 wherein locking said genlock on said mirror page and said genlock on said primary page provides an indication that said mirror page and said primary page are being accessed by a process performing a write operation.

7. A computer implemented consistency recovery method for recovering consistency after a process or system crash, comprising the steps of:

determining an appropriate primary page for comparison to a mirror page;

resolving the data to be utilized as valid data when recovering from a process or system crash; and restoring consistency, wherein both said appropriate primary page and said mirror page are consistent if the access counter values of both said appropriate primary page and said mirror page are equal and they are both unlocked.

8. A computer implemented consistency recovery method of claim 7 further comprising the step of allowing a writer to either complete or abort a transaction that crashed.

9. A computer implemented consistency recovery method for recovering consistency after a process or system crash, comprising the steps of:

determining an appropriate primary page for comparison to a mirror page;

resolving the data to be utilized as valid data when recovering from a process or system crash; and restoring consistency, wherein said appropriate primary page is consistent if an access counter value of said appropriate primary page is less than an access counter value of said mirror page and said appropriate page is unlocked and said mirror page is locked.

10. A computer implemented consistency recovery method for recovering consistency after a process or system crash, comprising the steps of:

determining an appropriate primary page for comparison to a mirror page;

resolving the data to be utilized as valid data when recovering from a process or system crash; and restoring consistency, wherein said mirror page is consistent if an access counter value of said appropriate primary page is equal to an access counter value of said mirror page and said primary page and said mirror page are locked.

11. A computer implemented consistency recovery method for recovering consistency after a process or system crash, comprising the steps of:

determining an appropriate primary page for comparison to a mirror page;

resolving the data to be utilized as valid data when recovering from a process or system crash; and restoring consistency, wherein said mirror page is consistent if the access counter value of said appropriate primary page is greater than the access counter value of said mirror page and said appropriate primary page is unlocked and said mirror page is locked.

12. A computer implemented consistency recovery method for recovering consistency after a process or system crash, comprising the steps of:

determining an appropriate primary page for comparison to a mirror page;

resolving the data to be utilized as valid data when recovering from a process or system crash; and restoring consistency, wherein said appropriate primary page and said mirror page are considered to be in an invalid state if said appropriate primary page is locked and the mirror page is unlocked and data included in said mirror page is considered valid for purposes of consistency restoration.

13. A computer implemented consistency recovery method for recovering consistency after a process or system crash, comprising the steps of:

determining an appropriate primary page for comparison to a mirror page;

resolving the data to be utilized as valid data when recovering from a process or system crash;

restoring consistency; and examining an atomic consistency element, wherein a first primary page comprising a bucket of information that is not an initial bucket of information associated with a particular value is said appropriate primary page if said atomic consistency element is zero.

14. A data consistency maintenance and recovery computer system comprising:

a bus for providing a communication path between components of computer system;

a central processing unit (CPU) coupled to said bus, said CPU handles information control and data processing including a first process and a second process that perform a write operation and read operation except when prevented by a lock; and a database coupled to said bus, said database stores information arranged in buckets of data including records comprising fields arranged on a plurality primary pages and maintains a plurality of mirror pages that are a copy of the data included in said plurality of primary pages except when said one of said first process and said second process perform a write operation, wherein said mirror page is written to before said primary page during said write operation.

15. The data consistency maintenance and recovery computer system of claim 14 wherein each one of said plurality of primary pages and each one of said plurality of mirror pages include an access counter value.

16. The data consistency maintenance and recovery computer system of claim 15 wherein said data consistency maintenance and recovery computer system compares the status of said lock included in each one of said plurality of primary pages to the status of said lock included in each one plurality of said mirror pages and compares an access counter value of said each one of said plurality of primary pages to an access counter value of said each one of said plurality of mirror pages to determine whether said each one of said plurality of primary pages and each one of said plurality of said mirror pages are consistent after recovering from a process or system crash.

17. The data consistency maintenance and recovery computer system of claim 14 wherein said lock is the lowest order bit of an access counter value.

18. The data consistency maintenance and recovery computer system of claim 17 wherein said lock is locked and unlocked by incrementing said access counter value.

19. The data consistency maintenance and recovery computer system of claim 14 wherein said first process and said second process lock each one of said plurality of mirror pages and each one of said plurality of primary page when beginning a write operation and unlock said each one of said plurality of said mirror page and each one of said plurality of primary pages when finishing a write operation.

* * * * *

UNITED STATES PATENT AND TRADEMARK OFFICE
CERTIFICATE OF CORRECTION

PATENT NO. : 6,721,739 B1  
APPLICATION NO. : 09/730871  
DATED : April 13, 2004  
INVENTOR(S) : Mende, Jr. et al.

Page 1 of 1

It is certified that error appears in the above-identified patent and that said Letters Patent is hereby corrected as shown below:

- In the References Cited Section, please insert the following:
  --6,453,325 B1, 9/2002, Cabrera et al., 707/204--
  --5,222,217 A, 6/1993, Blount et al., 707/204--
  --5,721,918 A, 2/1998, Nilsson et al., 707/202--
  --6,539,402 B1, 3/2003, Sorenson et al., 707/202--
  --5,113,522 A, 5/1992, Dinwiddie et al., 709/400--
  --5,991,804, 11/1999, Bolosky et al., 709/221--
  --6,209,002, 3/2001, Gagne et al., 707/204--
  --6,240,414, 5/2001, Beizer et al., 707/8--
  --6,363,385, 3/2002, Kedem et al., 707/10--

- In column 17, lines 10-11, "plurality primary" should be replaced with --plurality of primary--

- In column 18, line 19 "page when" should be replaced with --pages when--.

- In column 18, line 21 "page and" should be replaced with --pages and--.

Signed and Sealed this

Seventeenth Day of April, 2007

JON W. DUDAS  
*Director of the United States Patent and Trademark Office*